United States Patent [19]

Lojko et al.

[11] Patent Number: 4,495,813
[45] Date of Patent: Jan. 29, 1985

[54] JOGGER SPEEDOMETER AND ODOMETER

[75] Inventors: Jozef Lojko, Brooklyn; Richard L. Miller, Dix Hills, both of N.Y.

[73] Assignee: Jozef Lojko, Brooklyn, N.Y.

[21] Appl. No.: 539,094

[22] Filed: Oct. 5, 1983

[51] Int. Cl.³ .......................... G01P 1/00; G01B 3/12
[52] U.S. Cl. ...................................... 73/490; 73/493; 272/DIG. 5; 33/141 E
[58] Field of Search ........................ 73/490, 493, 128; 33/141 R, 141 E; 116/62.1; 272/70.3, DIG. 5, DIG. 9

[56] References Cited

U.S. PATENT DOCUMENTS

| 2,832,543 | 4/1958 | Swidzinski | 33/141 R |
| 3,251,132 | 5/1966 | Hall | 33/141 E |
| 3,616,541 | 11/1971 | Crayton | 33/141 R |
| 4,044,471 | 8/1977 | Peterson | 33/141 R |
| 4,136,451 | 1/1979 | Briand et al. | 33/141 E |
| 4,276,695 | 7/1981 | Stansbury, Jr. | 33/141 E |
| 4,375,294 | 3/1983 | Beauchamp | 272/70.3 |

FOREIGN PATENT DOCUMENTS 637699 10/1936 Fed. Rep. of Germany ........ 73/128

Primary Examiner—James J. Gill
Assistant Examiner—John E. Chapman, Jr.
Attorney, Agent, or Firm—Richard L. Miller

[57] ABSTRACT

A jogger speedometer and odometer device adapted to travel over a surface while secured to a jogger's body, is provided and consists of a wheel rotateably connected by a shaft between the bifurcations of a forked. The wheel is mechanically connected to an indicator unit attached to a handle that is attached to a flexible shaft. The wheel activates the indicator unit through the flexible shaft in accordance with the relative movement between the wheel and the surface.

2 Claims, 5 Drawing Figures

JOGGER SPEEDOMETER AND ODOMETER

BACKGROUND OF THE INVENTION

The instant invention relates generally to measuring instruments and more specifically it relates to a jogger speedometer and odometer device adapted to travel over a surface.

Numerous measuring instruments have been provided in prior art that are adapted to indicate speed and distance. For example, U.S. Pat. Nos. 2,279,409; 3,505,878 and 3,696,510 all are illustrative of such prior art. While these units may be suitable for the particular purpose to which they address, they would not be as suitable for the purposes of the present invention as heretofore described.

SUMMARY OF THE INVENTION

A principle object of the present invention is to provide a jogger speedometer and odometer device that measures distance and at the same time indicates the rate of speed that one is traveling running or walking.

Another object is to provide a jogger speedometer and odometer device that is made of plastic and aluminum to make it light weight.

An additional object is to provide a jogger speedometer and odometer device that is adjustable to the jogger simply by the angle at which it is used.

A further object is to provide a jogger speedometer and odometer device that is simple and easy to use.

A still further object is to provide a jogger speedometer and odometer device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENT

Figure 1:
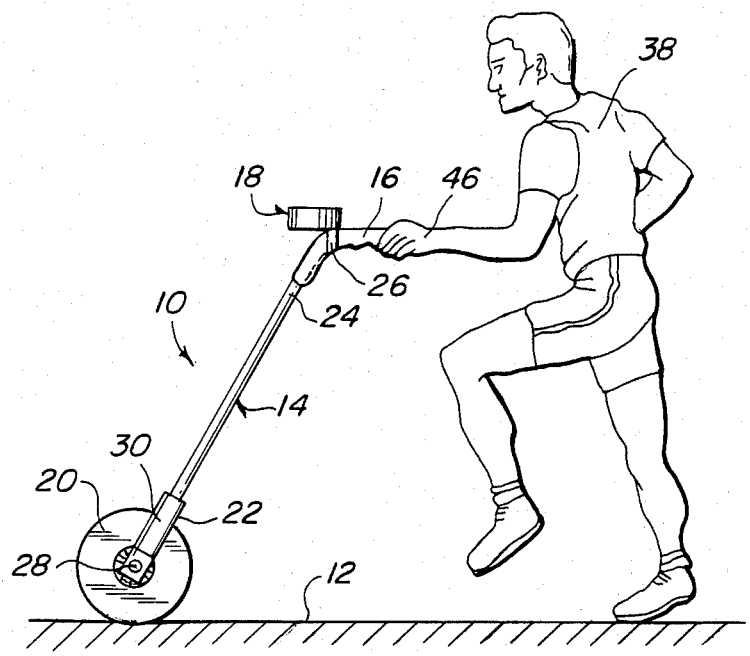
FIG. 1 is a side view of the invention being used by a jogger.
Figure 2:
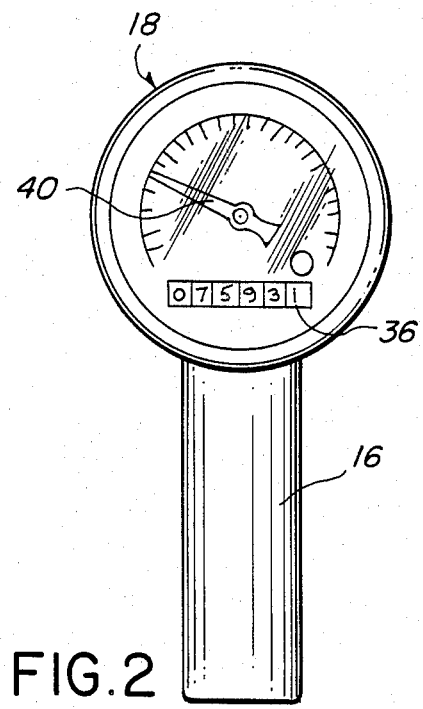
FIG. 2 is a top view showing the indicator unit in detail.
Figure 3:
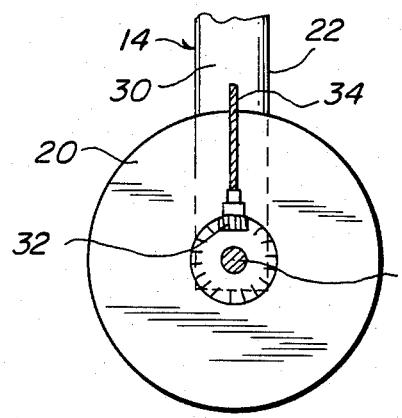
FIG. 3 is a side view partly in section showing the drive mechanism of the unit.

Turning now descriptively to the drawings, in which similar reference characters denote similar elements throughout the several views, FIGS. 1 through 3 illustrates a jogger speedometer and odometer device 10 adapted to travel over a surface 12 such as the outside ground, roads and the like. The device 10 consists of a shaft 14, a handle 16, an indicator unit 18 and a wheel 20.

The shaft 14 has a bottom forked end 22 while the handle 16 is attached to top end 24 of the shaft 14. The indicator unit 18 is attached to the handle 16 at 26. The wheel 20 is rotateably connected by an axle 28 between the bifurcations 30 of the bottom forked end 22 of the shaft 14. The wheel 20 is mechanically connected to the indicator unit 18 so as to transmit information to the indicator unit 10 in accordance with the relative movement between the wheel 20 and the surface 12.

As best seen in FIG. 3 the indicator unit 18 further contains a drive mechanism 32 actuated by the wheel 20 and a flexible shaft 34 connected between the drive mechanism 32 and the indicator unit 18.

As best seen in FIG. 2 the indicator unit comprises an odometer 36 for indicating total distance traveled by a jogger 38 and a speedometer 40 for indicating the maximum speed attained by the jogger 38.

The shaft 14 may be made of an aluminum and the handle 14 and the wheel 20 like wise made of plastic to make the device 10 lightweight.

Figure 4:
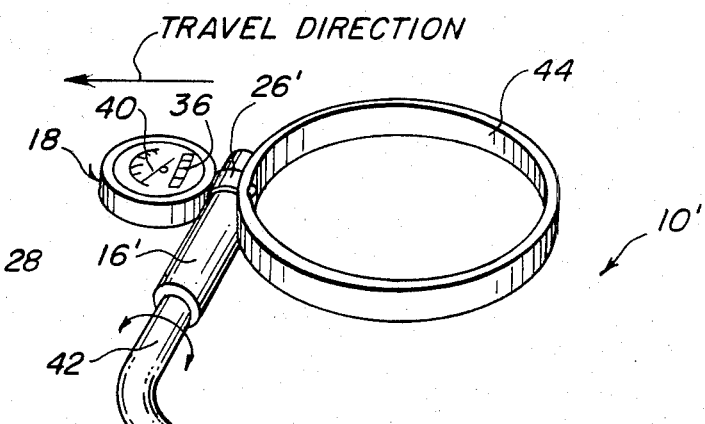
FIG. 4 is a perspective view of a modification showing the device attached to an elastic waist band so as free the jogger's hand for jogging more comfortably and in a normal manner.

FIG. 4 shows a modified device 10' further containing the configuration of the shaft 14' having a 90 degree sidewardly bent pivotable section 42 adjacent the handle 16' and an elastic waist band 44 attached to the handle 16' at 26' so as to free jogger's hand 46 for jogging more comfortably and in a normal manner.

Figure 5:
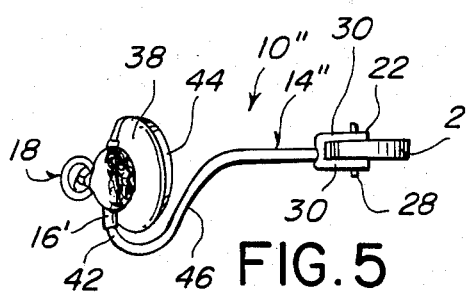
FIG. 5 is a still further modification in which the device is designed so as to eliminate undesirable torques and side twisting forces on the body of the jogger.

In FIG. 5 another modified device 10" is shown. The configuration of the shaft 14" has a 90 degree sidewardly bent pivotable section 42 adjacent the handle 16' and further contains an inwardly bent S-shaped section 46 to align the wheel 20 with center of the jogger's body 38 so as to eliminate undesirable torques and side twisting forces on the jogger's body 38.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A jogger speedometer and odometer device adapted to travel over a surface which comprises:
   (a) a shaft made of aluminum having a bottom forked end;
   (b) a handle made of plastic attached to top end of said shaft, the configuration of said shaft having a 90 degree sidewardly bent pivotable section adjacent said handle, and a waist band attached to said handle so as to free jogger's hand for jogging more comfortably and in a normal manner; and
   (c) an indicator unit attached to said handle; wherein said indicator unit further comprises, a drive mechanism activated by a wheel, a flexible shaft connected between said drive mechanism and said indicator unit, means for indicating total distance traveled by a jogger, and means for indicating the maximum speed attained by a jogger, said wheel being made of plastic and rotatably connected between the bifurcations of the bottom forked end of said shaft, said wheel being mechanically connected to said indicator unit to actuate said indicator unit in accordance with the relative movement between said wheel and the surface.

2. A jogger speedometer and odometer device as recited in claim 1 wherein said configuration of said shaft having a 90 degree sidewardly bent pivotable section adjacent said handle further comprises an inwardly bent S-shaped section to align said wheel with center of the jogger's body so as to eliminate undesirable torques and side twisting forces on the jogger's body.

* * * * *